(12) United States Patent
Kim et al.

(10) Patent No.: US 10,042,496 B2
(45) Date of Patent: Aug. 7, 2018

(54) DRIVING CIRCUIT AND ELECTRONIC DEVICE INCLUDING THE SAME

(71) Applicant: Samsung Display Co., Ltd., Yongin-si, Gyeonggi-do (KR)

(72) Inventors: Jeong Kyoo Kim, Yongin-si (KR); Kyung Man Kim, Yongin-si (KR); Kyung Youl Min, Yongin-si (KR); Choong Sun Shin, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 173 days.

(21) Appl. No.: 15/237,044

(22) Filed: Aug. 15, 2016

(65) Prior Publication Data
US 2017/0068388 A1 Mar. 9, 2017

(30) Foreign Application Priority Data
Sep. 7, 2015 (KR) .................... 10-2015-0126441

(51) Int. Cl.
  *G06F 3/044* (2006.01)
  *G06F 3/041* (2006.01)
  *G09G 3/20* (2006.01)
(52) U.S. Cl.
  CPC ............ *G06F 3/044* (2013.01); *G06F 3/0416* (2013.01); *G09G 3/20* (2013.01)
(58) Field of Classification Search
  CPC .......... G06F 3/044; G06F 3/0416; G09G 3/20
  See application file for complete search history.

(56) References Cited

U.S. PATENT DOCUMENTS

| | | | |
|---|---|---|---|
| 2006/0161846 A1* | 7/2006 | Van Leeuwen | G06F 3/04842 715/702 |
| 2011/0225328 A1* | 9/2011 | Ulenas | G06F 13/387 710/58 |
| 2014/0002400 A1* | 1/2014 | Christiansson | G06F 3/041 345/173 |
| 2014/0176498 A1* | 6/2014 | Yanase | G06F 3/044 345/174 |
| 2014/0347285 A1 | 11/2014 | Lee | |
| 2016/0117007 A1* | 4/2016 | Staudenmaier | G09G 5/026 345/629 |
| 2016/0179269 A1* | 6/2016 | Chun | G06F 3/0412 345/173 |
| 2016/0335940 A1* | 11/2016 | You | G06F 3/14 |
| 2017/0277332 A1* | 9/2017 | Seder | G06F 3/0416 |

FOREIGN PATENT DOCUMENTS

| | | |
|---|---|---|
| KR | 10-2014-0137814 A | 12/2014 |
| KR | 10-2015-0002202 A | 1/2015 |
| KR | 10-2016-0077510 A | 7/2016 |

* cited by examiner

*Primary Examiner* — Ariel Balaoing
(74) *Attorney, Agent, or Firm* — Innovation Counsel, LLP

(57) ABSTRACT

In an electronic device, touch coordinates, which are not pixel shift calibrated, are not transmitted from an application processor to a timing controller. Instead, pixel shift data are supplied to a touch position calculating unit disposed in a driving circuit or the application processor, and the touch position calculating unit generates pixel shift calibrated touch coordinates by reflecting the pixel shift data when calculating a touch position based on detection signals from a touch sensor. Accordingly, it is not necessary to transmit touch coordinates, which are not pixel shift calibrated, from the application processor to the timing controller, thereby decreasing a delay and power consumption due to frequency transception.

18 Claims, 5 Drawing Sheets

DRIVING CIRCUIT AND ELECTRONIC DEVICE INCLUDING THE SAME

CROSS-REFERENCE TO RELATED APPLICATION

This application claims priority to and the benefit of Korean Patent Application No. 10-2015-0126441, filed on Sep. 7, 2015, in the Korean Intellectual Property Office, the entire contents of which are incorporated herein by reference in their entirety.

BACKGROUND

1. Field

The present inventive concept relates to a driving circuit and an electronic device including the same.

2. Description of the Related Art

Demands for a portable electronic device, particularly, a smart device including a touch sensor capable of receiving a touch input of a user and a display panel displaying an image to a user, have been increased.

For a display panel, various flat panel display devices capable of decreasing weight and a volume, which are disadvantages of a cathode ray tube, have been developed. For example, the flat panel display device includes a liquid crystal display, a field emission display, a plasma display panel, an organic light emitting display device, and the like.

The organic light emitting display device has a disadvantage in that an organic light emitting diode is degraded when emitting light in response to a high grayscale, and particularly, when a difference in gray scales between adjacent organic light emitting diodes is large, a user may easily recognize distortion of an image quality.

Recently, in order to decrease a difference in gray scale between adjacent organic light emitting diodes, research on a pixel shift method of vertically or horizontally shifting an image displayed on a display panel for a predetermined period or whenever a specific condition is satisfied has been conducted.

SUMMARY

The present inventive concept provides a driving circuit, which calibrates pixel shift data when determining an input position of a touch based on detection signals from a touch sensor, so that touch coordinates, which are not pixel shift calibrated, need not to be transmitted from an application processor to a timing controller, and thus a delay and power consumption due to frequent transception are decreased, and an electronic device including the same.

Further, the present inventive concept provides a driving circuit, in which an application processor generates pixel shift calibrated touch coordinates, based on detection signals from a touch sensor and pixel shift data, so that touch coordinates, which are not pixel shift calibrated, need not to be transmitted from an application processor to a timing controller, and thus a delay and power consumption due to frequent transception are decreased and the number of processors required for the driving circuit is decreased, and an electronic device including the same.

An exemplary embodiment of the present inventive concept provides a driving circuit, including: a display panel driver configured to generate pixel shift processed data voltages based on pixel shift processed image signals, generate scan signals based on a timing control signal, and supply the pixel shift processed data voltages and the scan signals to a display panel; a timing controller configured to generate a timing control signal based on timing signals received from an application processor, and transmit the timing control signal and the pixel shift processed image signals to the display panel driver; a touch sensor driving and sensing unit configured to transceive a signal with electrodes of a touch sensor; and a display command controller configured to provide a clock signal to the timing controller, in which touch coordinates, which are not pixel shift calibrated, are not transmitted from the application processor to the timing controller, and the pixel shift processed image signals are pixel shift processed based on pixel shift data.

The driving circuit may be disposed on one board.

The electrodes may include driving electrodes and sensing electrodes, the touch sensor driving and sensing unit may transmit driving signals to the driving electrodes and receive detection signals from the sensing electrodes, the driving circuit may further include a touch position calculating unit that calculates a position of a touch input into the touch sensor based on the detection signals, the display command controller may supply the clock signal to the touch position calculating unit, and the touch position calculating unit may generate pixel shift calibrated touch coordinates based on the position of the touch and the pixel shift data, and transmit the pixel shift calibrated touch coordinates to the application processor.

The timing controller may receive image signals, which are not pixel shift processed, from the application processor, generate the pixel shift data, and generate the pixel shift processed image signals based on the pixel shift data and the image signals, which are not pixel shift processed, and the pixel shift data may be transmitted to the touch position calculating unit.

The driving circuit may further include a memory, in which a pixel shift data group is stored, in which the memory may select one in the pixel shift data group as the pixel shift data, the pixel shift data may be transmitted to the touch position calculating unit and the timing controller, and the timing controller may receive image signals, which are not pixel shift processed, from the application processor, and generate the pixel shift processed image signals based on the pixel shift data and the image signals, which are not pixel shift processed.

The electrodes may include driving electrodes and sensing electrodes, and the touch sensor driving and sensing unit may transmit driving signals to the driving electrodes, and receive detection signals from the sensing electrodes and transmit the received detection signals to the application processor.

Another exemplary embodiment of the present inventive concept provides an electronic device including a driving circuit. The electronic device includes: a touch sensor, of which resistance or capacitance is changed when a touch is input; a display panel configured to display an image based on pixel shift processed data voltages based on pixel shift data; a driving circuit configured to drive the touch sensor and the display panel by supplying the pixel shift processed data voltages to the display panel and a transception of a signal with electrodes of the touch sensor, respectively; and an application processor configured to transceive a signal with the driving circuit, in which the driving circuit may include: a display panel driver configured to generate the pixel shift processed data voltages based on pixel shift processed image signals, generate scan signals based on a timing control signal, and supply the pixel shift processed data voltages and the scan signals to the display panel; a timing controller configured to generate the timing control signal based on timing signals received from the application processor, and transmit the pixel shift processed image signals and the timing control signal to the display panel driver; a touch sensor driving and sensing unit configured to transceive a signal with the electrodes of the touch sensor; and a display command controller configured to provide a clock signal to the timing controller, wherein touch coordinates, which are not pixel shift calibrated, are not transmitted from the application processor to the timing controller, and the pixel shift processed image signals are pixel shift processed based on the pixel shift data.

The driving circuit may be disposed on one board.

The electrodes may include driving electrodes and sensing electrodes, and the touch sensor driving and sensing unit may transmit driving signals to the driving electrodes and receive detection signals from the sensing electrodes, the driving circuit may further include a touch position calculating unit that calculates a position of a touch input into the touch sensor, the display command controller may supply the clock signal to the touch position calculating unit, and the touch position calculating unit may generate pixel shift calibrated touch coordinates based on the position of the touch and the pixel shift data.

The pixel shift data may be generated by the timing controller and transmitted to the touch position calculating unit.

The driving circuit may further include a memory, in which a pixel shift data group is stored. The application processor may include a touch position calculating unit that calculates a touch position based on the detection signals, the memory may select one of the pixel shift data in the pixel shift data group as the pixel shift data, and the pixel shift data may be transmitted to the touch position calculating unit and the timing controller.

The electrodes may include driving electrodes and sensing electrodes, and the touch sensor driving and sensing unit may transmit driving signals to the driving electrodes, and receive detection signals from the sensing electrodes and transmit the received detection signals to the application processor.

The electronic device may further include a memory, in which a pixel shift data group is stored, in which the application processor may include a touch position calculating unit that calculates a touch position based on the detection signals, the memory may select one in the pixel shift data group as the pixel shift data, and the pixel shift data may be transmitted to the application processor.

The application processor may generate the pixel shift processed image signals based on image signals, which are not pixel shift processed, received from the external device and the pixel shift data, and transmit the pixel shift processed image signals to the driving circuit.

The application processor may transmit the pixel shift data and image signals, which are not pixel shift processed, received from the external device to the timing controller, and the timing controller may generate the pixel shift processed image signals based on the pixel shift data and the image signals, which are not pixel shift processed.

The application processor may include a memory, in which a pixel shift data group is stored, and a touch position calculating unit that calculates a touch position based on the detection signals, and the memory may select one of the pixel shift data in the pixel shift data group as the pixel shift data.

The application processor may generate the pixel shift processed image signals based on image signals, which are not pixel shift processed, received from the external device and the pixel shift data, and transmit the pixel shift processed image signals to the driving circuit.

The application processor may transmit the pixel shift data and image signals, which are not pixel shift processed, received from the external device to the timing controller, and the timing controller may generate the pixel shift processed image signals based on the pixel shift data and the image signals, which are not pixel shift processed, received from the external device.

According to the exemplary embodiments of the present inventive concept, there are provided the driving circuit, which calibrates pixel shift data when determining an input position of a touch based on detection signals from a touch sensor, so that touch coordinates, which are not pixel shift calibrated, need not to be transmitted from an application processor to a timing controller, and thus a delay and power consumption due to frequent transception are decreased, and the electronic device including the same.

Further, according to the exemplary embodiments of the present inventive concept, there are provided the driving circuit, in which an application processor generates pixel shift calibrated touch coordinates, based on detection signals from a touch sensor and pixel shift data, so that touch coordinates, which are not pixel shift calibrated, need not to be transmitted from an application processor to a timing controller, and thus a delay and power consumption due to frequent transception are decreased and the number of processors required for the driving circuit is decreased, and the electronic device including the same.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF THE INVENTIVE CONCEPT

Figure 1:
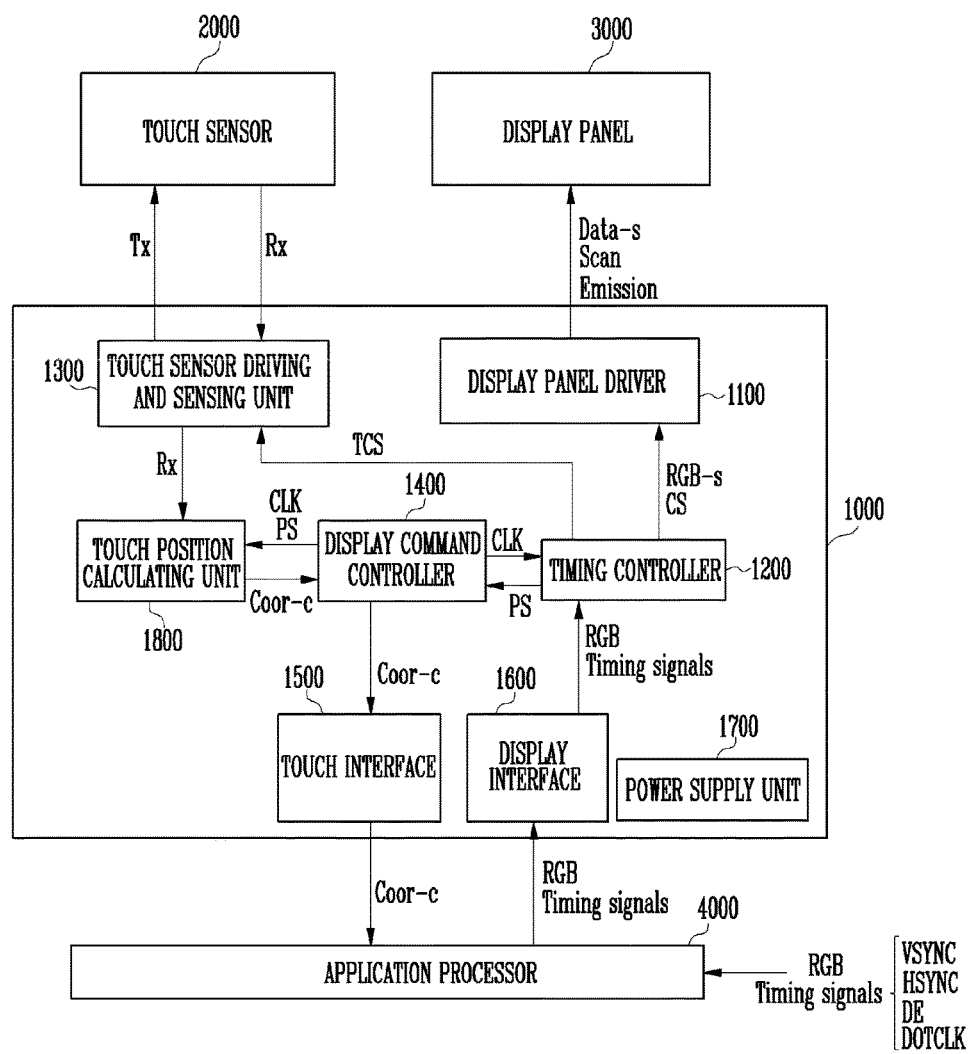
FIG. 1 is a diagram illustrating an electronic device according to an exemplary embodiment of the present inventive concept.

Hereinafter, exemplary embodiments of the present inventive concept will be described in detail with reference to the accompanying drawings. Like reference numerals principally refer to like elements throughout the specification. In the following description, when the detailed description of the relevant known function or configuration is determined to unnecessarily obscure the important point of the present inventive concept, the detailed description is not provided. Further, a name of a constituent elements used in description below may be selected in consideration of easiness of writing the specification, and thus may be different from a name of a component of an actual product.

Figure 2:
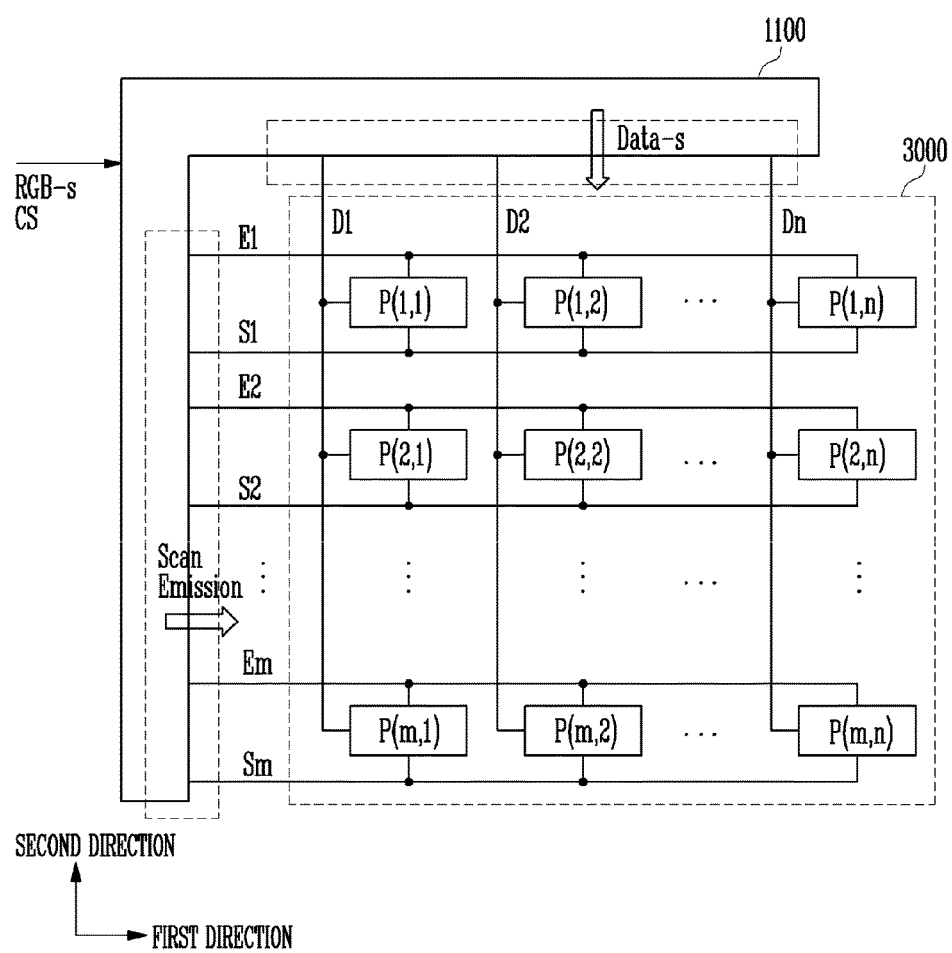
FIG. 2 is a diagram for describing a display panel and a display panel driver of the electronic device of FIG. 1.

FIG. 1 is a diagram illustrating an electronic device according to an exemplary embodiment of the present inventive concept, and FIG. 2 is a diagram for describing a display panel and a display panel driver of the electronic device of FIG. 1. The electronic device includes a driving circuit 1000, a touch sensor 2000, a display panel 3000, and an application processor 4000. In an exemplary embodiment described with reference to FIG. 1, pixel shift data PS is generated by a timing controller 1200, and pixel shift calibrated touch coordinates Coor-c, are generated by a touch position calculating unit 1800 in the driving circuit 1000.

The driving circuit 1000 includes a display panel driver 1100, the timing controller 1200, a touch sensor driving and sensing unit 1300, a display command controller 1400, a touch interface 1500, a display interface 1600, a power supply unit 1700, and a touch position calculating unit 1800.

The display panel driver 1100 receives pixel shift processed image signals RGB-s, and a timing control signal CS from the timing controller 1200, and generates pixel shift processed data voltages Data-s based on the pixel shift processed image signals RGB-s, and generates scan signals Scan based on the timing control signal CS. Further, the display panel driver 1100 drives the display panel 3000 by supplying the pixel shift processed data voltages Data-s and the scan signals Scan to the display panel 3000. According to a driving method of the display panel 3000, the display panel driver 1100 may further generate emission control signals Emission based on the timing control signal CS, and further supply the emission control signals Emission to the display panel 3000.

The timing controller 1200 receives image signals RGB and timing signals Timing signals from the application processor 4000 through the display interface 1600. Further, the timing controller 1200 generates the pixel shift data PS and supplies the generated pixel shift data PS to the display command controller 1400. The pixel shift data PS generated by the timing controller 1200 may be generated based on at least one of an emission time, an accumulated emission luminance, and a sum of emission grayscales of the display panel 3000. Referring to FIG. 2, the display panel 3000 includes pixels P(1, 1) to P(m, n) (m and n are natural numbers), and scan lines S1 to Sm (hereinafter, referred to as "S") and data lines D1 to Dn (hereinafter, referred to as "D") electrically connected to the pixels P(1, 1) to P(m, n) (hereinafter, referred to as "P"). According to an exemplary embodiment, the display panel 3000 may further include emission control lines E1 to Em (hereinafter, referred to as "E") electrically connected to the pixels P. The display panel driver 1100 generates the pixel shift processed data voltages Data-s based on the pixel shift processed image signals RGB-s and supplies the data voltages Data-s to the data lines D, and generates the scan signals Scan based on the timing control signal CS and supplies the generated scan signals Scan to the scan lines S. According to an exemplary embodiment, the display panel driver 1100 may generate the emission control signals Emission based on the timing control signal CS and supply the generated emission control signals Emission to the emission control lines E. In the display panel driver 1100, n pixels P are arranged in a first direction, and m pixels P are arranged in a second direction. The pixel shift data PS may be expressed in a form of (a, b) (a and b are integers). When the pixel shift data PS is (a, b), a pixel (c, d) in a $c^{th}$ row and a $d^{th}$ column (c are integers, of which absolute values is 1 or greater and m or less, and d is an integer, of which an absolute value is 1 or greater and n or less) among the image signals RGB, which are not pixel shift processed, corresponds to a pixel (c+a, d+b) among the pixel shift processed image signals RGB-s. The timing controller 1200 may generate the pixel shift processed image signals RGB-s based on the pixel shift data PS and the image signals RGB, which are not pixel shift processed. The timing controller 1200 may include a look-up table (not shown), and the look-up table may output a row shift amount and a column shift amount based on an accumulated frame number. The pixel shift data PS may be generated based on the row shift amount and the column shift amount. Further, the timing controller 1200 may supply a touch sensor timing control signal TCS to the touch sensor driving and sensing unit 1300. The touch sensor timing control signal TCS may be generated based on the timing signals Timing signals or a clock signal CLK.

The touch sensor driving and sensing unit 1300 transceives a signal with electrodes of the touch sensor 2000. For example, when the touch sensor 2000 uses a mutual capacitance scheme, the electrodes of the touch sensor 2000 include driving electrodes and sensing electrodes. In this case, the touch sensor driving and sensing unit 1300 transmits driving signals Tx to the driving electrodes in the touch sensor 2000 and receives detection signals Rx from the sensing electrodes in the touch sensor 2000. The touch sensor driving and sensing unit 1300 may transmit the detection signals Rx to the touch position calculating unit 1800. Additionally, the touch sensor driving and sensing unit 1300 may transmit the detection signal Rx to the touch position calculating unit 1800. According to another exemplary embodiment, the touch sensor driving and sensing unit 1300 may further transmit the driving signal Tx to the touch position calculating unit 1800. Further, the touch sensor driving and sensing unit 1300 receives the touch sensor timing control signal TCS from the timing controller 1200, so that when the touch sensor driving and sensing unit 1300 senses a touch, the touch sensor driving and sensing unit 1300 may be easily synchronized with the timing controller 1200.

The display command controller 1400 supplies the clock signal CLK to the timing controller 1200. According to an exemplary embodiment, the display command controller 1400 may further supply the clock signal CLK to the touch position calculating unit 1800. In this case, the timing controller 1200 and the touch position calculating unit 1800 having the clock signal CLK may be sufficiently synchronized. Further, the display command controller 1400 receives the pixel shift data PS from the timing controller 1200, and transmits the pixel shift data PS to the touch position calculating unit 1800. The display command controller 1400 receives the pixel shift calibrated touch coordinates Coor-c, and transmits the received pixel shift calibrated touch coordinates Coor-c to the touch interface 1500.

The touch interface 1500 transmits the pixel shift calibrated touch coordinates Coor-c from the display command controller 1400 to the application processor 4000.

The display interface 1600 receives the image signals RGB and the timing signals Timing signals from the application processor 4000, and transmits the image signals RGB and the timing signals Timing signals to the timing controller 1200. The timing signals Timing signals include a vertical synchronization signal Vsync, a horizontal synchronization signal Hsync, a data enable signal DE, a dot clock DOTCLK, and the like. The touch interface 1500 and the display interface 1600 may also perform a multiplexing or de-multiplexing function for overcoming a difference in the number of ports or a transceiving speed. When there is no difference in the number of ports and the transceiving speed, the touch interface 1500 and the display interface 1600 may also be omitted.

The power supply unit 1700 supplies power to the driving circuit 1000 disposed on one board.

The touch position calculating unit 1800 calculates touch coordinates based on the detection signals Rx from the touch sensor driving and sensing unit 1300. The touch position calculating unit 1800 generates the pixel shift calibrated touch coordinates Coor-c while calculating the touch coordinates based on the detection signals Rx and calibrating using the pixel shift data PS received from the display command controller 1400. For example, when the pixel shift data PS is (a, b) and the touch coordinates, which are not pixel shift calibrated, is P(c+a, d+b), the pixel shift calibrated touch coordinates Coor-c is P(c, d). The touch position calculating unit 1800 may also receive the pixel shift data PS from the display command controller 1400, but may also receive the pixel shift data PS directly from the timing controller 1200. When the touch position calculating unit 1800 receives the pixel shift data PS, the touch position calculating unit 1800 stores the pixel shift data PS until receiving new pixel shift data directly from the timing controller 1200 or via display command controller 1400.

The touch sensor 2000 includes the electrodes. When touch sensor 2000 uses a mutual capacitance scheme, the electrodes of the touch sensor 2000 include the driving electrodes and the sensing electrodes. The touch sensor 2000 receives the driving signals Tx from the touch sensor driving and sensing unit 1300 and transmits the detection signals Rx to the touch sensor driving and sensing unit 1300. When capacitance is changed by a contact of a conductive object to the touch sensor, levels of voltages or currents of the detection signals Rx corresponding to the driving signals Tx may be changed.

The display panel 3000 receives the pixel shift processed data voltage Data-S and the scan signals Scan from the display panel driver 1100, and displays a pixel shift processed image.

The application processor 4000 receives the image signals RGB and the timing signals Timing signals from an external device (not illustrated), and transmits the received image signals RGB and timing signals Timing signals to the display interface 1600. Further, the application processor 4000 receives the pixel shift calibrated touch coordinates Coor-c from the touch interface 1500, and determines a command of a user based on the received pixel shift calibrated touch coordinates Coor-c, and responds to the command of the user.

When a touch sensor driving unit and a display unit are separately provided, the touch sensor driving unit and the touch position calculating unit need to be separately existed. When the display panel driver generates the pixel shift data and performs the pixel shift, the display panel driver requires a minimum of three stages of transceiving process with the application processor so that the application processor receives the pixel shift calibrated touch coordinates (the touch coordinates desired by the user). First, i) the touch coordinates, which are not pixel shift calibrated, are transmitted from the touch sensor driving unit to the application processor, and ii) the touch coordinates, which are not pixel shift calibrated, are transmitted from the application processor to the display panel driver. The display panel driver generates the pixel shift calibrated touch coordinates based on the touch coordinates, which are not pixel shift calibrated, and the pixel shift data generated by the display panel driver. Then, iii) the pixel shift calibrated touch coordinates are transmitted from the display panel driver to the application processor. In this case, the amount of transception is large, which is troublesome. Further, there is a risk in that the touch coordinates, which are not pixel shift calibrated, are transmitted to the application processor.

However, in a case of the electronic device described with reference to FIG. 1, the touch coordinates, which are not pixel shift calibrated, are not transmitted from the application processor to the display panel driver, and the touch position calculating unit 1800 receives the detection signals Rx and the pixel shift data PS, so that the pixel shift calibrated touch coordinates Coor-c are directly generated by the touch position calculating unit 1800, and the pixel shift calibrated touch coordinates Coor-c are transmitted to the application processor 4000. Accordingly, the stages of the transception process with the application processor are decreased to one stage. Further, the pixel shift calibrated touch coordinates Coor-c are directly generated from the touch position calculating unit 1800 and transmitted to the application processor 4000, so that the touch coordinates, which are not pixel shift calibrated, are not transmitted to the application processor 4000.

Figure 3:
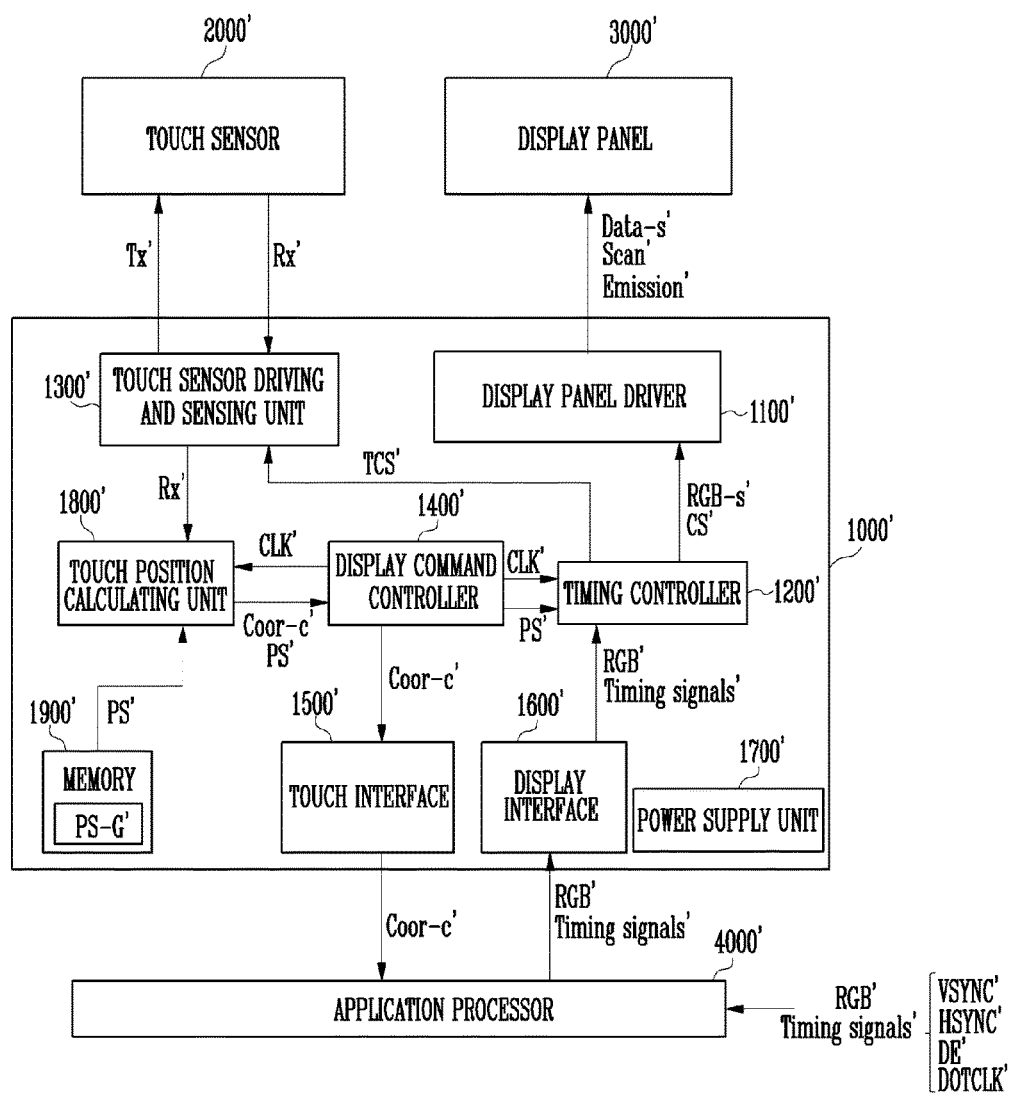
FIG. 3 is a diagram for describing an electronic device according to another exemplary embodiment of the present inventive concept.

FIG. 3 is a diagram for describing an electronic device according to another exemplary embodiment of the present inventive concept. The electronic device described with reference to FIG. 3 includes a driving circuit 1000', a touch sensor 2000', a display panel 3000', and an application processor 4000'. In the exemplary embodiment described with reference to FIG. 3, pixel shift data PS' is generated by a memory 1900', and pixel shift calibrated touch coordinates Coor-c' are generated by the touch position calculating unit 1800'. The touch sensor 2000', the display panel 3000', and the application processor 4000' are the same as the touch sensor 2000, the display panel 3000, and the application processor 4000 illustrated in FIG. 1, respectively, so that detailed description thereof will be omitted.

The driving circuit 1000' includes a display panel driver 1100', a timing controller 1200', a touch sensor driving and sensing unit 1300', a display command controller 1400', a touch interface 1500', a display interface 1600', a power supply unit 1700', a touch position calculating unit 1800', and the memory 1900'. The display panel driver 1100', the touch sensor driving and sensing unit 1300', the touch interface 1500', the display interface 1600', and the power supply unit 1700' are the same as the display panel driver 1100, the touch sensor driving and sensing unit 1300, the touch interface 1500, the display interface 1600, and the power supply unit 1700 illustrated in FIG. 1, respectively, so that detailed description thereof will be omitted.

The timing controller 1200' generates pixel shift processed image signals RGB-s' and a timing control signal CS' based on a clock signal CLK' and pixel shift data PS' received from the display command controller 1400' and image signals RGB' and timing signals Timing signals' received from the display interface 1600'. The generation of the pixel shift processed image signals RGB-s' has been already described with reference to FIGS. 1 and 2. According to an exemplary embodiment, the timing controller 1200' may also directly receive the pixel shift data PS' from the memory 1900'. The timing controller 1200' supplies the pixel shift processed image signals RGB-s' and the timing control signal CS' to the display panel driver 1100'. Further, the timing controller 1200' may supply a touch sensor timing control signal TCS' to the touch sensor driving and sensing unit 1300'. The touch sensor timing control signal TCS' may be generated based on the timing signals Timing signals' or the clock signal CLK'.

The display command controller 1400' generates the clock signal CLK' and transmits the generated clock signal CLK' to the timing controller 1200' and the touch position calculating unit 1800'. Further, the display command controller 1400' receives the pixel shift calibrated touch coordinates Coor-c' and the pixel shift data PS' from the touch position calculating unit 1800', transmits the pixel shift calibrated touch coordinates Coor-c' to the touch interface 1500', and transmits the pixel shift data PS' to the timing controller 1200'. In this case, the timing controller 1200' and the touch position calculating unit 1800' having the clock signal CLK' may be sufficiently synchronized.

The touch position calculating unit 1800' generates the pixel shift calibrated touch coordinates Coor-c' while calculating the touch coordinates based on detection signals Rx' and calibrating the touch coordinates using the pixel shift data PS' received from the memory 1900'. A detailed process of generating the pixel shift calibrated touch coordinates Coor-c' has been already described with reference to FIG. 1, so that a detailed description thereof will be omitted. When the touch position calculating unit 1800' receives the pixel shift data PS' from the memory 1900', the touch position calculating unit 1800' stores the pixel shift data PS' until receiving new pixel shift data from the memory 1900'.

The memory 1900' stores a pixel shift data group PS-G', and selects one in the pixel shift data group PS-G' as the pixel shift data PS' and transmits the selected pixel shift data PS' to the touch position calculating unit 1800'. The pixel shift data group PS-G' may include a look-up table (not shown), and the look-up may table include row shift amounts and column shift amounts. A row shift amount and a column shift amount may be selected from the row shift amounts and the column shift amounts, respectively, based on an accumulated frame number. The pixel shift data PS' may be generated based on the selected row shift amount and the selected column shift amount. According to an exemplary embodiment, the memory 1900' may also directly transmit the pixel shift data PS' to the timing controller 1200'.

When the pixel shift data PS' is uniform or repeated, the pixel shift data PS' is not generated by the timing controller 1200', and one in the pixel shift data group PS-G' stored in the memory 1900' may also be selected as the pixel shift data PS' by the memory 1900'.

In the exemplary embodiment described with reference to FIG. 3, the stages of the transception process with the application processor are decreased to one stage, so that the touch coordinates, which are not pixel shift calibrated, is not transmitted to the application processor.

Figure 4:
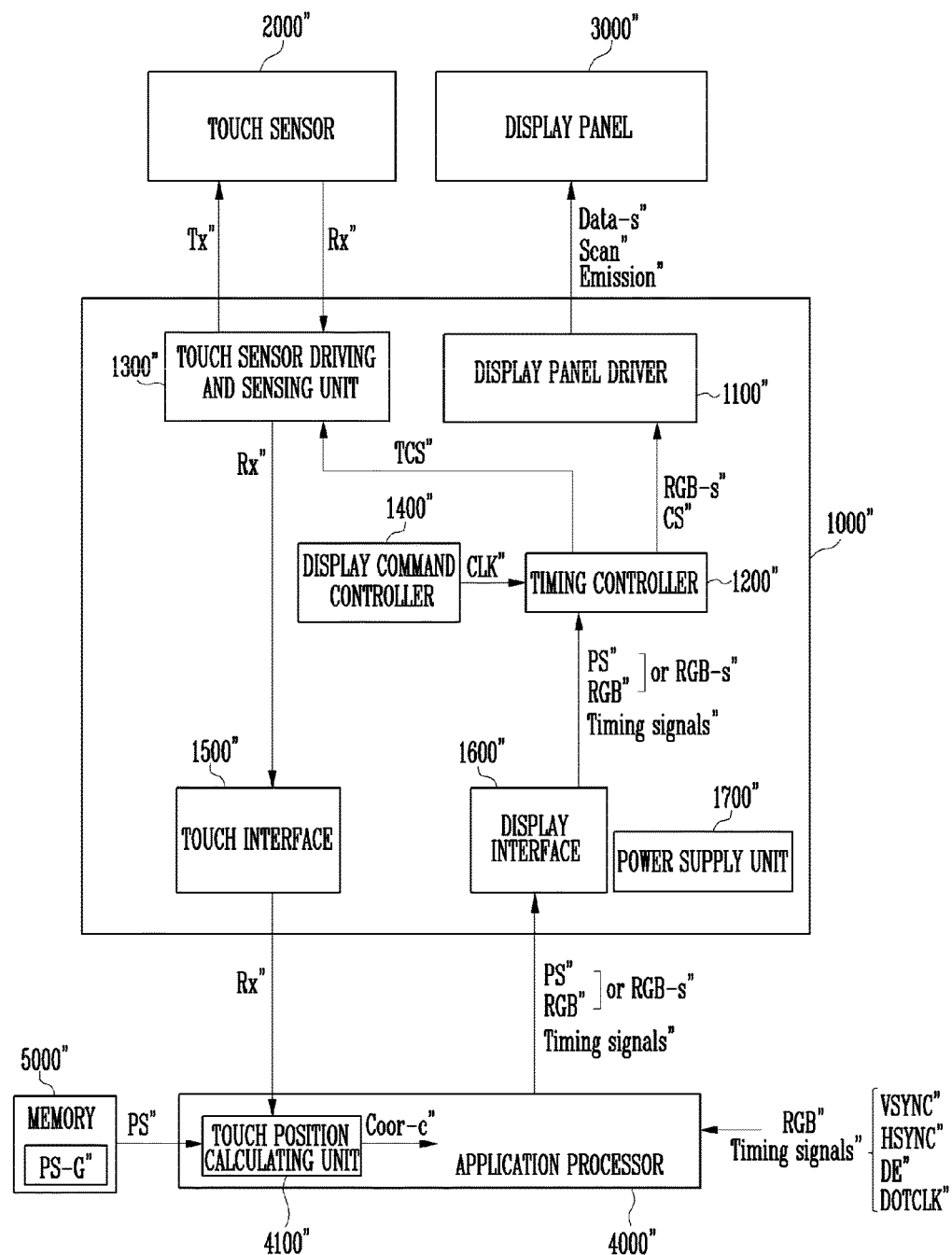
FIG. 4 is a diagram for describing an electronic device according to yet another exemplary embodiment of the present inventive concept.

FIG. 4 is a diagram for describing an electronic device according to still yet another exemplary embodiment of the present inventive concept. The electronic device includes a driving circuit 1000", a touch sensor 2000", a display panel 3000", an application processor 4000", and a memory 5000". In the exemplary embodiment described with reference to FIG. 4, pixel shift data PS" is generated by the memory 5000", and pixel shift calibrated touch coordinates Coor-c" are generated by a touch position calculating unit 4100" within the application processor 4000". The touch sensor 2000" and the display panel 3000" are the same as the touch sensor 2000 and the display panel 3000 illustrated in FIG. 1, respectively, so that detailed descriptions thereof will be omitted.

The driving circuit 1000" includes a display panel driver 1100", a timing controller 1200", a touch sensor driving and sensing unit 1300", a display command controller 1400", a touch interface 1500", a display interface 1600", and a power supply unit 1700". The display panel driver 1100" and the power supply unit 1700" are the same as the display panel driver 1100 and the power supply unit 1700 illustrated in FIG. 1, respectively, so that detailed descriptions thereof will be omitted.

The timing controller 1200" receives a clock signal CLK" from the display command controller 1400" and pixel shift data PS", image signals RGB", and timing signals Timing signals" from the application processor 4000"' through the display interface 1600" and generates pixel shift processed image signals RGB-s" and a timing control signal CS". The timing controller 1200" supplies the pixel shift processed image signals RGB-s" and the timing control signal CS" to the display panel driver 1100". The generation of the pixel shift processed image signals RGB-s" has been already described with reference to FIGS. 1 and 2.

According to another exemplary embodiment, when the pixel shift processed image signals RGB-s" is generated by the application processor 4000", the timing controller 1200" may directly receive the pixel shift processed image signals RGB-s" from the display interface 1600" instead of receiving the pixel shift data PS" and the image signals RGB" from the display interface 1600". Further, the timing controller 1200" may supply a touch sensor timing control signal TCS" to the touch sensor driving and sensing unit 1300". The touch sensor timing control signal TCS" may be generated based on the timing signals Timing signals" or the clock signal CLK".

The touch sensor driving and sensing unit 1300" transceives a signal with electrodes of the touch sensor 2000". For example, when the touch sensor 2000" uses a mutual capacitance scheme, the electrodes of the touch sensor 2000" include driving electrodes and sensing electrodes. In this case, the touch sensor driving and sensing unit 1300" transmits driving signals Tx" to the driving electrodes and receives detection signals Rx" from the sensing electrodes. The touch sensor driving and sensing unit 1300" may transmit the detection signals Rx" to the touch interface 1500". Additionally, the touch sensor driving and sensing unit 1300" may transmit the driving signals Tx" to the touch interface 1500". Further, the touch sensor driving and sensing unit 1300" receives the touch sensor timing control signal TCS" from the timing controller 1200", so that when the touch sensor driving and sensing unit 1300" senses a touch, the touch sensor driving and sensing unit 1300" may be easily synchronized with the timing controller 1200".

The display command controller 1400" generates the clock signal CLK" and transmits the generated clock signal CLK" to the timing controller 1200".

The touch interface 1500" receives the detection signals Rx" from the touch sensor driving and sensing unit 1300", and transmits the detection signals Rx" to the touch position calculating unit 4100" of the application processor 4000". According to an exemplary embodiment, the driving signals Tx" may be transmitted to the touch position calculating unit 4100".

The display interface 1600" receives the pixel shift data PS", the image signals RGB", and the timing signals Timing signals" from the application processor 4000", and transmits the pixel shift data PS", the image signals RGB", and the timing signals Timing signals" to the timing controller 1200". The timing signals Timing signals" include a vertical synchronization signal Vsync", a horizontal synchronization signal Hsync", a data enable signal DE", a dot clock DOTCLK", and the like. When the application processor 4000" receives the pixel shift data PS" and the image signals RGB" and generates the pixel shift processed image signals RGB-s", the display interface 1600" receives the pixel shift processed image signals RGB-s" and the timing signals Timing signals" and transmits the received pixel shift processed image signals RGB-s" and timing signals Timing signals" to the timing controller 1200". The touch interface 1500" and the display interface 1600" may also perform a multiplexing or de-multiplexing function for overcoming a difference in the number of ports or a transceiving speed. When there is no difference in the number of ports and the transceiving speed, the touch interface 1500" and the display interface 1600" may also be omitted.

The application processor 4000" includes the touch position calculating unit 4100". The touch position calculating unit 4100" receives the detection signal Rx" from the touch interface 1500" and receives the pixel shift data PS" from the memory 5000". The touch position calculating unit 4100" generates the pixel shift calibrated touch coordinates Coor-c" while calculating the touch coordinates based on detection signals Rx" and calibrating the touch coordinates using the pixel shift data PS" received from the memory 5000". When the touch position calculating unit 4100" receives the pixel shift data PS" from the memory 5000", the touch position calculating unit 4100" stores the pixel shift data PS" until receiving new pixel shift data from the memory 5000". The calibration of the touch coordinates based on the pixel shift data has been already described with reference to FIGS. 1 and 2. The application processor 4000" determines a command of a user based on the pixel shift calibrated touch coordinates Coor-c" and responds to the command of the user. The touch position calculating unit 4100" may also receive the driving signals Tx". Further, the application processor 4000" receives the image signals RGB" and the timing signals Timing signals" from an external device (not illustrated), receives the pixel shift data PS" from the memory 5000", and transmits the image signals RGB", the timing signals Timing signals", and the pixel shift data PS" to the display interface 1600".

When the application processor 4000" generates the pixel shift processed image signals RGB-s" based on the pixel shift data PS" and the image signals RGB", the pixel shift processed image signals RGB-s" may be transmitted to the display interface 1600", instead of the pixel shift data PS" and the image signals RGB". The display interface 1600" receives the pixel shift processed image signals RGB-s" and the timing signals Timing signals" and transmits the received pixel shift processed image signals RGB-s" and timing signals Timing signals" to the timing controller 1200".

The memory 5000" stores a pixel shift data group PS-G", and selects one in the pixel shift data group PS-G" as the pixel shift data PS" and transmits the selected pixel shift data PS" to the touch position calculating unit 4100".

When the touch sensor driving unit and the display unit are separately provided, the touch sensor driving unit and the touch position calculating unit need to separately exist. When the display panel driver generates the pixel shift data and performs the pixel shift, the display panel driver requires a minimum of three stages of transceiving process with the application processor so that the application processor receives the pixel shift calibrated touch coordinates (the touch coordinates desired by the user). First, i) the touch coordinates, which are not pixel shift calibrated, are transmitted from the touch sensor driving unit to the application processor, and ii) the touch coordinates, which are not pixel shift calibrated, are transmitted from the application processor to the display panel driver. The display panel driver generates the pixel shift calibrated touch coordinates based on the touch coordinates, which are not pixel shift calibrated, and the pixel shift data generated by the display panel driver. Then, iii) the pixel shift calibrated touch coordinates are transmitted from the display panel driver to the application processor. In this case, the amount of transception is large, which is troublesome. Further, there is a risk in that the touch coordinates, which are not pixel shift calibrated, are transmitted to the application processor.

However, in a case of the electronic device described with reference to FIG. 4, the touch coordinates, which are not pixel shift calibrated, are not transmitted from the application processor to the display panel driver, and the touch position calculating unit 4100" receives the detection signals Rx" and the pixel shift data PS", so that the pixel shift calibrated touch coordinates Coor-c are directly generated by the touch position calculating unit 4100". Accordingly, the transception of the touch coordinates is not required. Further, the pixel shift calibrated touch coordinates Coor-c" are directly generated, so that the touch coordinates, which are not pixel shift calibrated, are not transmitted to the application processor. Further, the application processor 4000" basically includes a calculating unit. If the capacity of the calculating unit is sufficient, a part of the calculating unit may be used as the touch position calculating unit 4100". In this case, the number of processors performing the calculation is decreased, so that production cost is also decreased.

Figure 5:
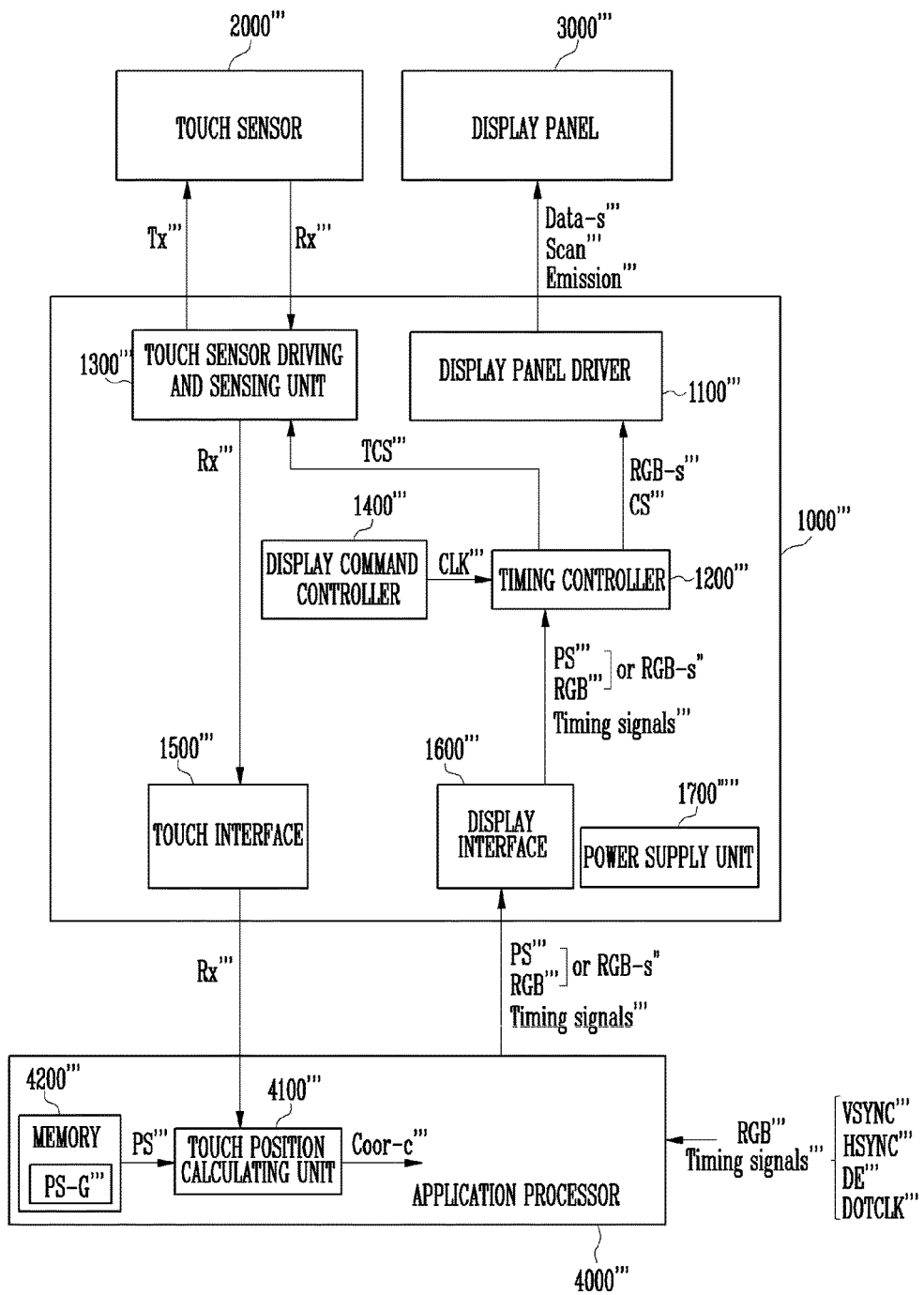
FIG. 5 is a diagram for describing an electronic device according to still yet another exemplary embodiment of the present inventive concept.

FIG. 5 is a diagram for describing an electronic device according to another exemplary embodiment of the present inventive concept. The electronic device includes a driving circuit 1000''', a touch sensor 2000''', a display panel 3000''', and an application processor 4000'''. In the exemplary embodiment described with reference to FIG. 5, pixel shift data PS''' is generated by a memory 4200''' of the application processor 4000''', and pixel shift calibrated touch coordinates Coor-c''' are generated by a touch position calculating unit 4100''' within the application processor 4000'''. The driving circuit 1000''', the touch sensor 2000''', and the display panel 3000''' are the same as the driving circuit 1000, the touch sensor 2000, and the display panel 3000 illustrate in FIG. 1, respectively, so that detailed descriptions thereof will be omitted.

The application processor 4000''' includes a touch position calculating unit 4100''' and the memory 4200'''. The touch position calculating unit 4100''' receives the pixel shift data PS''' from the memory 4200''', receives detection signals Rx''' from the touch interface 1500''', and generates pixel shift calibrated touch coordinates Coor-c''' based on the pixel shift data PS''' and the detection signals Rx'''. When the touch position calculating unit 4100''' receives the pixel shift data PS''' from the memory 4200''', the touch position calculating unit 4100''' stores the pixel shift data PS''' until receiving new pixel shift data from the memory 42000'''. The application processor 4000''' determines a command of a user based on the pixel shift calibrated touch coordinates Coor-c''' and responds to a command of a user. Similar to the memory 5000", the memory 4200''' stores a pixel shift data group PS-G''', and selects one in the pixel shift data group PS-G′″ as the pixel shift data PS′″ and transmits the selected pixel shift data PS′″ to the touch position calculating unit 4100′″.

In a case of the electronic device described with reference to FIG. 5, the touch coordinates, which are not pixel shift calibrated, are not transmitted from the application processor to the display panel driver, and the touch position calculating unit 4100′″ receives the detection signals Rx′″ and the pixel shift data PS′″, so that the pixel shift calibrated touch coordinates Coor-c′″ are directly generated by the touch position calculating unit 4100′″. Accordingly, the transception of the touch coordinates is not required. Further, the pixel shift calibrated touch coordinates Coor-c′″ are directly generated by the touch position calculating unit 4100′″, so that the touch coordinates, which are not pixel shift calibrated, are not transmitted to the application processor. Further, the application processor 4000′″ basically includes a calculating unit. If capacities of the calculating unit and the memory are sufficient, a part of the calculating unit in the application processor 4000′″ may be used as the touch position calculating unit 4100′″ and a part of the memory may be used as the memory 4200′″. In this case, the number of processors performing the calculation is decreased, so that production cost is also decreased.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present inventive concept as set forth in the following claims.

What is claimed is:

1. A driving circuit, comprising:
   a display panel driver configured to generate pixel shift processed data voltages based on pixel shift processed image signals, generate scan signals based on a timing control signal, and supply the pixel shift processed data voltages and the scan signals to a display panel;
   a timing controller configured to generate the timing control signal based on timing signals received from an application processor, and transmit the timing control signal and the pixel shift processed image signals to the display panel driver;
   a touch sensor driving and sensing unit configured to transceive a signal with electrodes of a touch sensor; and
   a display command controller configured to provide a clock signal to the timing controller,
   wherein touch coordinates, which are not pixel shift calibrated, are not transmitted from the application processor to the timing controller, and
   the pixel shift processed image signals are pixel shift processed based on pixel shift data.

2. The driving circuit of claim 1, wherein the driving circuit is disposed on one board.

3. The driving circuit of claim 1, wherein the electrodes include driving electrodes and sensing electrodes,
   the touch sensor driving and sensing unit transmits driving signals to the driving electrodes and receives detection signals from the sensing electrodes,
   the driving circuit further includes a touch position calculator that calculates a position of a touch input into the touch sensor based on the detection signals,
   the display command controller supplies the clock signal to the touch position calculator, and
   the touch position calculator generates pixel shift calibrated touch coordinates based on the position of the touch and the pixel shift data, and transmits the pixel shift calibrated touch coordinates to the application processor.

4. The driving circuit of claim 3, wherein the timing controller receives image signals, which are not pixel shift processed, from the application processor, generates the pixel shift data, and generates the pixel shift processed image signals based on the pixel shift data and the image signals, which are not pixel shift processed, and
   the pixel shift data is transmitted to the touch position calculator.

5. The driving circuit of claim 3, further comprising:
   a memory, in which a pixel shift data group is stored,
   wherein the memory selects one in the pixel shift data group as the pixel shift data,
   the pixel shift data is transmitted to the touch position calculator and the timing controller, and
   the timing controller receives image signals, which are not pixel shift processed, from the application processor, and generates the pixel shift processed image signals based on the pixel shift data and the image signals, which are not pixel shift processed.

6. The driving circuit of claim 3, wherein the electrodes include driving electrodes and sensing electrodes, and
   the touch sensor driving and sensing unit transmits driving signals to the driving electrodes, and receives detection signals from the sensing electrodes and transmits the received detection signals to the application processor.

7. An electronic device, comprising:
   a touch sensor, of which resistance or capacitance is changed when a touch is input;
   a display panel configured to display an image based on pixel shift processed data voltages based on pixel shift data;
   a driving circuit configured to drive the touch sensor and the display panel by supplying the pixel shift processed data voltages to the display panel and a transception of a signal with electrodes of the touch sensor, respectively; and
   an application processor configured to transceive a signal with the driving circuit,
   wherein the driving circuit includes:
   a display panel driver configured to generate the pixel shift processed data voltages based on pixel shift processed image signals, generate scan signals based on a timing control signal, and supply the pixel shift processed data voltages and the scan signals to the display panel;
   a timing controller configured to generate the timing control signal based on timing signals received from the application processor, and transmit the pixel shift processed image signals and the timing control signal to the display panel driver;
   a touch sensor driving and sensing unit configured to transceive a signal with the electrodes of the touch sensor; and
   a display command controller configured to provide a clock signal to the timing controller, wherein touch coordinates, which are not pixel shift calibrated, are not transmitted from the application processor to the timing controller, and the pixel shift processed image signals are pixel shift processed based on the pixel shift data.

8. The electronic device of claim 7, wherein the driving circuit is disposed on one board.

9. The electronic device of claim 7, wherein the electrodes include driving electrodes and sensing electrodes, and the touch sensor driving and sensing unit transmits driving signals to the driving electrodes and receives detection signals from the sensing electrodes, the driving circuit further includes a touch position calculator that calculates a position of a touch input into the touch sensor, the display command controller supplies the clock signal to the touch position calculator, and the touch position calculator generates pixel shift calibrated touch coordinates based on the position of the touch and the pixel shift data.

10. The electronic device of claim 9, wherein the pixel shift data is generated by the timing controller and transmitted to the touch position calculator.

11. The electronic device of claim 9, wherein the driving circuit further includes a memory, in which a pixel shift data group is stored, the memory selects one in the pixel shift data group as the pixel shift data, and the pixel shift data is transmitted to the touch position calculator and the timing controller.

12. The electronic device of claim 9, wherein the electrodes include driving electrodes and sensing electrodes, and the touch sensor driving and sensing unit transmits driving signals to the driving electrodes, and receives detection signals from the sensing electrodes and transmits the received detection signals to the application processor.

13. The electronic device of claim 12, further comprising: a memory, in which a pixel shift data group is stored, wherein the application processor includes a touch position calculator that calculates a touch position based on the detection signals, the memory selects one of the pixel shift data in the pixel shift data group as the pixel shift data, and the pixel shift data is transmitted to the application processor.

14. The electronic device of claim 13, wherein the application processor generates the pixel shift processed image signals based on image signals, which are not pixel shift processed, received from the external device and the pixel shift data, and transmits the pixel shift processed image signals to the driving circuit.

15. The electronic device of claim 13, wherein the application processor transmits the pixel shift data and image signals, which are not pixel shift processed, received from the external device to the timing controller, and the timing controller generates the pixel shift processed image signals based on the pixel shift data and the image signals, which are not pixel shift processed.

16. The electronic device of claim 12, wherein the application processor includes a memory, in which a pixel shift data group is stored, and a touch position calculator that calculates a touch position based on the detection signals, and the memory selects one of the pixel shift data in the pixel shift data group as the pixel shift data.

17. The electronic device of claim 16, wherein the application processor generates the pixel shift processed image signals based on image signals, which are not pixel shift processed, received from the external device and the pixel shift data, and transmits the pixel shift processed image signals to the driving circuit.

18. The electronic device of claim 16, wherein the application processor transmits the pixel shift data and image signals, which are not pixel shift processed, received from the external device to the timing controller, and the timing controller generates the pixel shift processed image signals based on the pixel shift data and the image signals, which are not pixel shift processed, received from the external device.

* * * * *